UNITED STATES PATENT OFFICE.

MEINHARD HOFFMANN AND CARL F. DAIMLER, OF FEEHENHEIM, NEAR FRANKFORT-ON-THE-MAIN, ASSIGNORS TO LEOPOLD CASSELLA & CO., OF FRANKFORT-ON-THE-MAIN, GERMANY.

DISAZO DARK-GREEN DYE.

SPECIFICATION forming part of Letters Patent No. 514,599, dated February 13, 1894.

Application filed June 20, 1892. Serial No. 437,277. (Specimens.) Patented in France September 10, 1891, No. 201,770.

*To all whom it may concern:*

Be it known that we, MEINHARD HOFFMANN and CARL FRIEDRICH DAIMLER, subjects of the King of Prussia, and residents of Feehenheim, near Frankfort-on-the-Main, Germany, have invented new and useful Improvements in the Production of New Disazo Dye-Stuffs, of which the following is a specification.

The object of our invention is the production of new disazodyestuffs for which additional certificate dated September 10, 1891, to Patent No. 201,770 has been issued in France. The amidonaphtol disulfo acid H (which is described in Patent No. 464,135 of December 1, 1891,) can be combined successively with two molecules of diazo bodies.

The novelty of the present process consists in using one molecule of a tetrazoic body as second reagent.

The reaction of one equivalent of coloring matters produced from amidonaphtoldisulfonic acid H and diazo bodies in acid solution upon one equivalent of a tetrazoic body produces intermediate products of the following constitution:

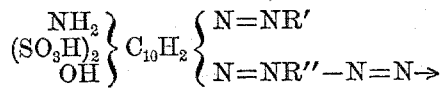

which products in consequence of their containing a free diazoic group, may be combined with phenols or amines.

In carrying out this process we proceed for instance as follows: 13.8 kilos of paranitraniline are diazotized and an acid or neutral solution of thirty-two kilos amidonaphtol disulfonic acid H is added. When the reaction is terminated the solution is made alkaline by addition of sodium-carbonate and that quantity of tetrazodiphenyle, which is obtained from 18.4 kilos benzidin, is then added. The intermediate product separates in the shape of a black precipitate. A solution of ten kilos of phenol is now added. After the lapse of a few hours, the reaction will be terminated and the coloring matter is then precipitated with common salt. It dyes wool from an acid or neutral bath a dark green and unmordanted cotton from a neutral or an alkaline bath.

In the place of paranitranilin other amins may be used such as anilin, anilinsulfo acid, metanitranilin, the nitrotoluidins, beta naphtylamin-sulfo acids, amidoazobenzenesulfonic acids. Other paradiamins may take the place of benzidin as for instance, tolidin, methylbenzidin, diamido ethoxydiphenyl or diamidodiphenolether. If salicylic acid, cresotinic acid, cresol or resorcin are substituted for the phenol, green coloring matters of similar properties are obtained.

What we claim as new, and desire to secure by Letters Patent, is—

1. The process of producing disazo coloring matters, which consists in treating one molecule of the amidonaphtoldisulfonic acid H with a solution of one molecule of a diazoic body in presence of free acid, the solution is made alkaline and one molecule of a tetrazo body is added; the solution which now contains the intermediate product is mixed with the solution of a phenol or of an amin and the dyestuff which results is precipitated by means of common salt, substantially as described.

2. The new coloring matter hereinbefore described, derived from one molecule of a diazo compound, one molecule of amidonaphtoldisulfo acid H, one molecule of a tetrazo compound and one molecule of a phenol such as phenol, cresol, salicylic acid, resorcin, phenol-sulfo acid,—which forms a dark-green powder, easily soluble in water with a bluish or greenish color, nearly insoluble in alcohol, dissolving in concentrated sulfuric acid with a violet-black shade and forming a black precipitate by adding water to this solution.

In testimony that we claim the foregoing as our invention we have signed our names, in presence of two witnesses, this 4th day of June, 1892.

MEINHARD HOFFMANN.
        CARL F. DAIMLER.

Witnesses:
    ALVESTO S. HOGUE,
    JEAN GRUND.